A. LOOMIS.
BOW SEPARATOR FOR VEHICLE TOPS.
APPLICATION FILED OCT. 7, 1907.
994,852.
Patented June 13, 1911.
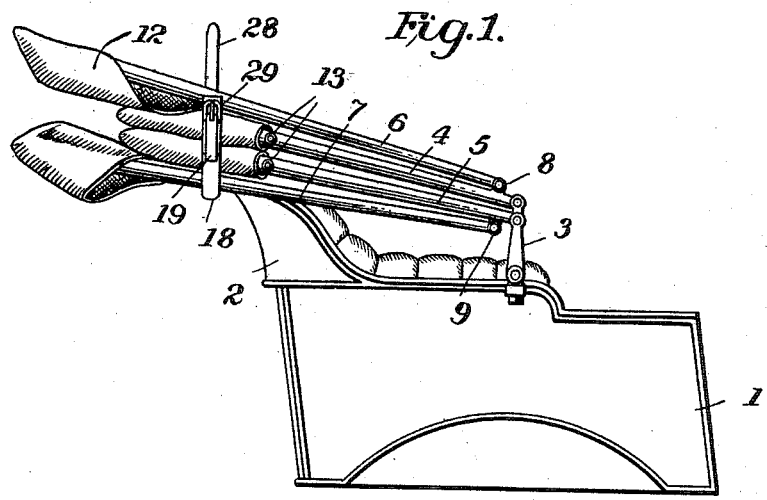
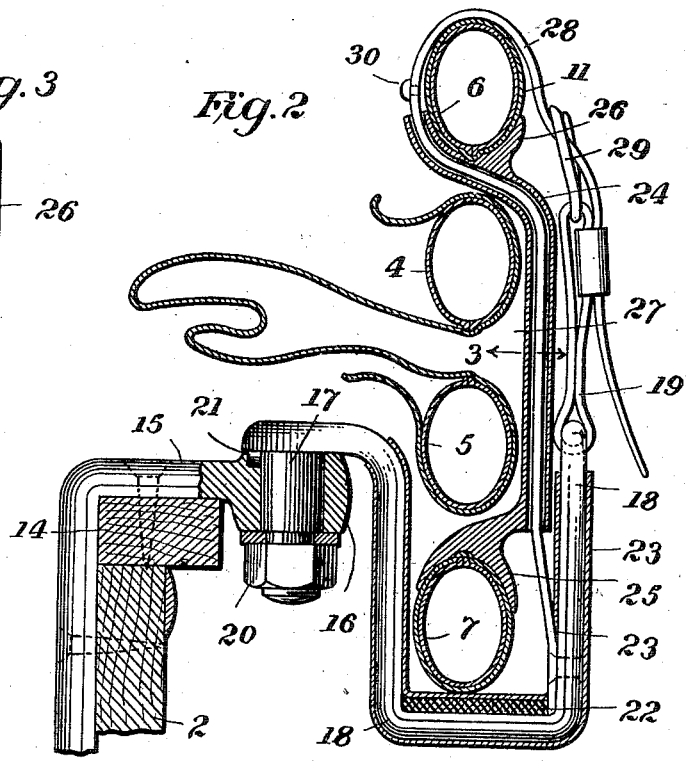
Witnesses
Inventor
Allen Loomis
By Foster Freeman Watson
Attorneys

UNITED STATES PATENT OFFICE.

ALLEN LOOMIS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

BOW-SEPARATOR FOR VEHICLE-TOPS.

994,852.

Specification of Letters Patent.    Patented June 13, 1911.

Application filed October 7, 1907. Serial No. 396,330.

*To all whom it may concern:*

Be it known that I, ALLEN LOOMIS, a citizen of the United States, and resident of Detroit, Wayne county, State of Michigan, have invented certain new and useful Improvements in Bow-Separators for Vehicle-Tops, of which the following is a specification.

In motor vehicles having long bodies and folding tops, the tops are usually constructed with two long bows and two intermediate shorter bows. When the top is folded these bows extend to the rear and are superposed one upon the other, and it is necessary to provide means for holding them both relatively to each other and to the vehicle to prevent chafing of the bows and of the cloth or other fabric of which the top is made.

The present invention relates to means for securely holding the bows of a vehicle top both with respect to each other and to the vehicle body.

The invention will be described in connection with the accompanying drawing, in which, Figure 1 is side elevation of a part of the vehicle body, illustrating the top in its folded position; Fig. 2 is a sectional view of the bow separator and lock or holding device; and Fig. 3 is a section on the line 3 of Fig. 2.

Referring to the drawing, 1 indicates the body of the vehicle, 2 the back portion of the rear seat, 3 one of the brackets to which the folding top is pivoted, 4, 5, the short intermediate bows which are pivoted directly to the bracket 3, and 6, 7, the front and rear bows which are pivoted respectively to the bows 4 and 5 at the points 8 and 9. The bows are preferably hollow metal rods covered with leather or other suitable material 11. The fabric 12 extends along the shorter bows to points 13 which are much nearer the bracket 3 than the extreme points of connection of the fabric with the longer bows. A bow separator arranged between the points 13 and the bracket 3 would not properly support the longer bows as they would be subject to vibration and possible breakage in the rear of the separator. On the other hand, a bow separator of ordinary construction could not be connected with the bows 4, 5, in the rear of the points 13 without injuring the fabric 12 of the top. To properly support the longer bows I therefore provide, upon each side of the vehicle, a bow support and separator which is connected with the longer bows in the rear of the points 13 and which passes around the shorter bows and suitably confines them.

Referring particularly to Fig. 2, 14 indicates the frame at the upper margin of the rear seat 2 and 15 a bracket rigidly connected to the frame and having a projecting head 16 formed with an eye to receive the stud 17 on the bow-rest 18. The bow-rest is U-shaped, one of its branches carrying the stud 17 and the other branch being formed with a loop 18 adapted to receive a strap 19. The rest is removably secured to the bracket 15 by means of a nut 20 and it is prevented from turning in the bracket by a pin or shoulder 21 which enters a recess in the bracket. The bow-rest 18 is preferably provided with a cushion 22 upon which the lower or rearmost bow 7 rests when the top is folded, and the bow-rest and cushion are preferably covered with leather or other suitable material 23.

The separator proper comprises a tubular body 24, an offset lower seat or crotch 25 which rests upon the lower bow 7 and an offset upper seat or crotch 26 upon which the forward or upper bow 6 rests. The seats 25 26, are offset from the body 24 to provide a recess 27 between the said seats to receive the intermediate bows 4, 5. A strap 28 is securely connected with the rest at its lower end and passes upward through the body of the separator and out through the upper seat. This strap is adapted to pass around the upper bow and to be securely engaged with the strap 19 by means of a buckle 29 or other suitable fastening.

It will be evident that when the parts are in the position illustrated in Fig. 2, the bow separator will hold the lower bow 7 down tightly upon the cushion 22 of the rest 18 and will also hold the upper bow upon the upper crotch of the separator. The separator is made of such length that the intermediate bows will be rather tightly confined between the crotches 25, 26, and will be held against injurious vibration by the cover fabric which is attached to them. All of the parts of the carriage top are thus securely connected with the body of the vehicle and injurious vibration or breakage are thus prevented. It will be understood that the body of the separator might be solid and other means might be provided for guiding the strap 28. The tubular body however affords a neat construction and prevents the strap from chafing the intermediate bows. A stop 30 may be provided for preventing the separator from becoming detached from the strap 28. By removing the nut 20 the rest and its connected parts may be detached when not required for use. It will be seen that the bow separator is adapted to be rigidly connected with the bows, but is flexibly connected with the bow rest and the vehicle. The separator may thus accommodate itself to the bows and is not liable to strain them, as it would be if it were rigidly connected with the vehicle body.

Having described my invention what I claim and desire to secure by Letters Patent is, 1. The combination with a vehicle top having long bows and intermediate short bows, of a rest connected with the vehicle and adapted to receive the under long bow, a bow separator supported on said under bow and supporting the upper long bow independently of the intermediate bows, said separator having a recess to receive the intermediate bows, and means for securely connecting said bows to said separator and to the rest.

2. The combination with a vehicle top having two long bows and an intermediate bow, of a rest connected with the vehicle and adapted to sustain the under bow, a bow separator resting on the said under bow and directly supporting the upper bow, the weight of the upper bow being sustained by the lower bow through the separator and independently of the intermediate bow, and a strap connected with the rest at one end and passing between the upper and intermediate bows and around the upper bow and detachably connected at its other end to said rest.

3. The combination with a vehicle top having two long bows and an intermediate bow, of a rest connected with the vehicle and adapted to sustain the under bow, a bow separator resting on the said under bow and directly supporting the upper bow, the weight of the upper bow being sustained by the lower bow, and a strap connected with the rest at one end and passing between the upper and intermediate bows and around the upper bow and detachably connected at its other end to said rest.

4. In a carriage top support, the combination with a bracket secured to the carriage body, of a rest for the carriage top secured to said bracket, and a bow separator flexibly secured to said rest, for the purpose set forth.

5. The combination with a vehicle body of a bow separator and means for flexibly connecting the separator to the body, whereby it may adjust itself to the bows.

6. The combination with a vehicle body and with a folding vehicle top, of a rest for the bows of the top, a bow separator, and means for flexibly connecting the separator to the rest, whereby it may adjust itself to the bows.

7. The combination with a carriage body, of a rest carried thereby and adapted to sustain the carriage top, a bow separator having a tubular body and seats to receive the upper and lower bows of the folded top, and a strap passing through said body and connected to said rest, for the purpose set forth.

8. The combination with a carriage body, of a rest for the bows of the carriage top, a relatively movable bow separator, and a strap connecting the separator to the rest, said strap being adapted to pass around one of the bows and secure it to the separator.

9. A bow separator comprising a tubular body portion, an offset, outwardly disposed, crotch at one end thereof having a channel formed therein opening into the interior of the body portion, and an offset oppositely disposed crotch at the other end.

10. A bow separator having seats to receive the upper and lower bows, and guiding means for a strap for securing the upper bow in position, said guiding means extending transversely under the seat for the upper bow.

11. The combination with a rest and a plurality of bows supported thereon, of a bow separator, and a strap connecting said separator with said rest and adapted to secure the bows.

12. The combination with a rest and a plurality of bows supported thereon, of a bow separator, and a strap connected at both ends to the rest and having its looped portion passing through a portion of said separator and around one of said bows to secure the bows.

13. The combination with a vehicle and a vehicle top having at least three bows; the intermediate bow or bows having the top fabric attached nearer their forward ends than the other bows, of a rest for the bows arranged to support the bows rearward of the forward point of attachment of the top fabric, a bow separator having seats for the upper and lower bows, and a rest for the intermediate bow or bows, and means for securing the bows to the separator, said means being so arranged as not to surround the intermediate bow or bows whereby said intermediate bow or bows may be supported at a point rearward of the forward point of attachment of the top fabric.

In testimony whereof I affix my signature in presence of two witnesses.

ALLEN LOOMIS.

Witnesses:
  MILTON TIBBETTS,
  CLARA DALE.

Copies of this patent may be obtained for five cents each, by addressing the "Commissioner of Patents, Washington, D. C."